April 3, 1962

L. J. MANN ET AL 3,027,732

REFRIGERATING APPARATUS

Filed March 13, 1961

INVENTORS
Leonard J. Mann
Everett C. Armentrout
John J. O'Connell
BY Carl A. Stickel
THEIR ATTORNEY April 3, 1962

L. J. MANN ET AL 3,027,732

REFRIGERATING APPARATUS

Filed March 13, 1961

INVENTORS
Leonard J. Mann
Everett C. Armentrout
John J. O'Connell
BY
Carl A. Stickel
THEIR ATTORNEY

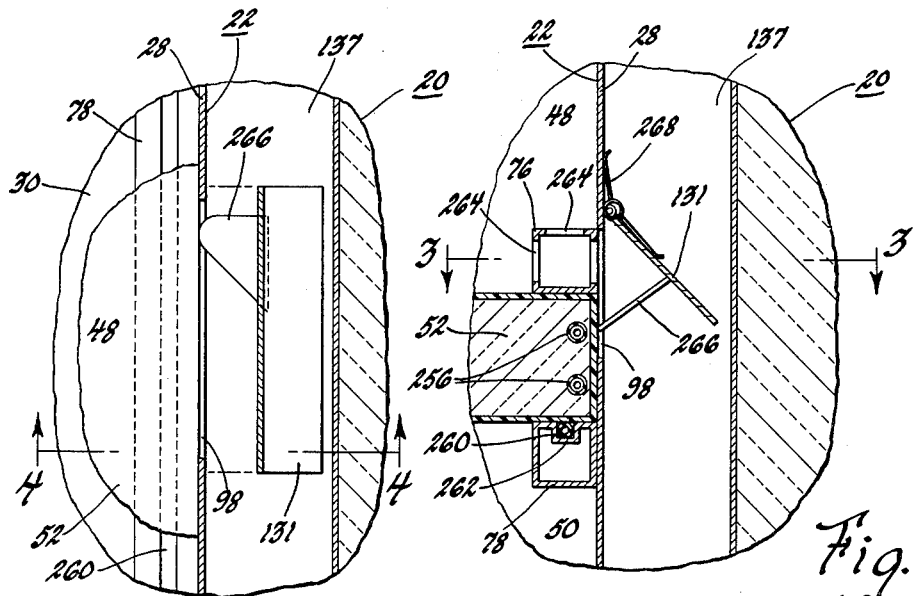
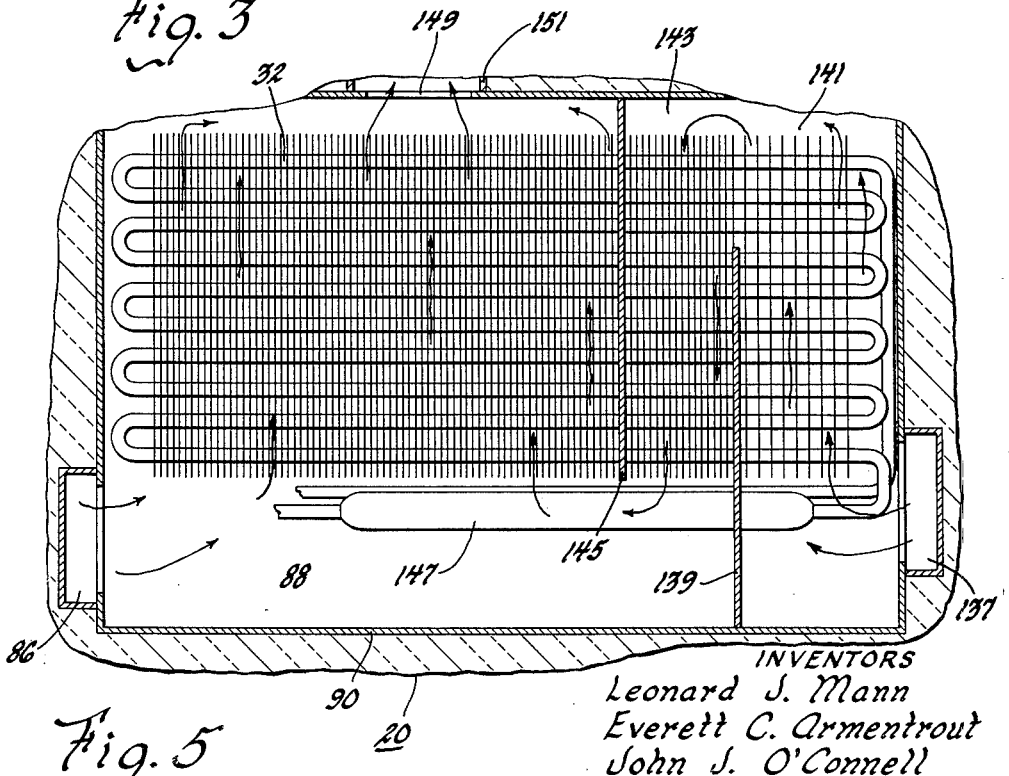

April 3, 1962     L. J. MANN ET AL     3,027,732
REFRIGERATING APPARATUS
Filed March 13, 1961     4 Sheets-Sheet 4
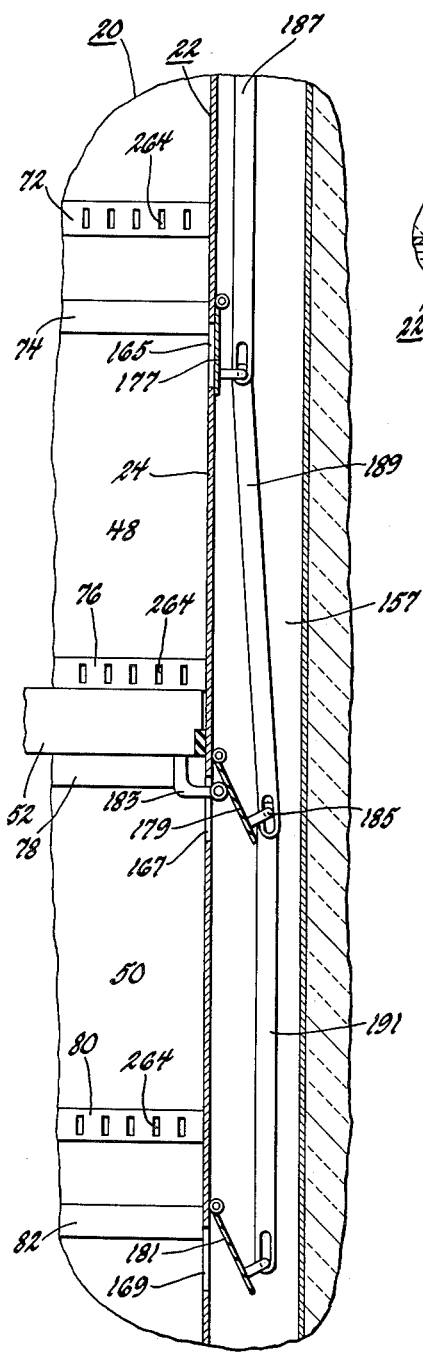
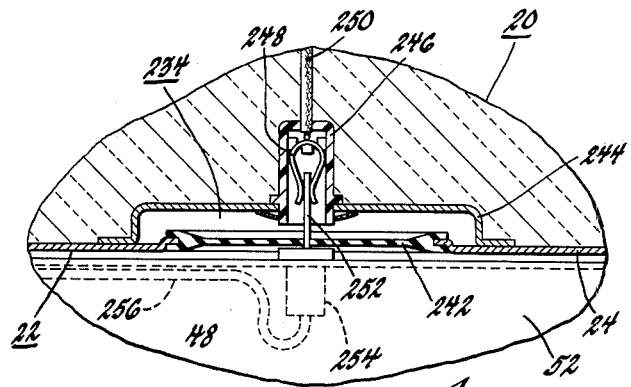
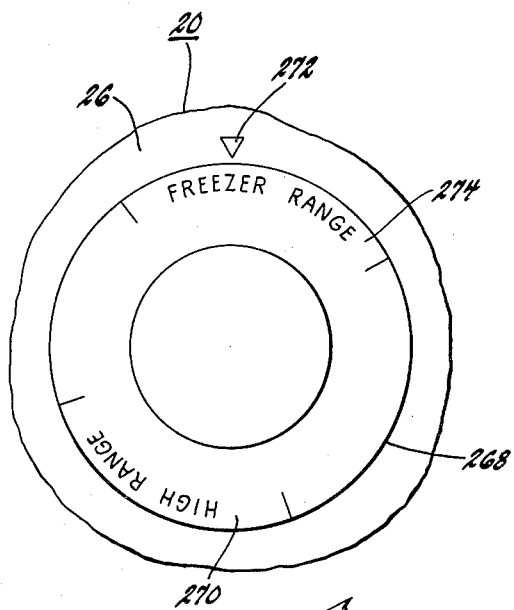
INVENTORS
Leonard J. Mann
Everett C. Armentrout
John J. O'Connell
BY Carl A. Stickel
THEIR ATTORNEY United States Patent Office 3,027,732
Patented Apr. 3, 1962

3,027,732
REFRIGERATING APPARATUS
Leonard J. Mann, Dayton, Everett C. Armentrout, New Carlisle, and John J. O'Connell, Dayton, Ohio, assignors to General Motors Corporation, Detroit, Mich., a corporation of Delaware
Filed Mar. 13, 1961, Ser. No. 95,327
13 Claims. (Cl. 62—187)

This invention pertains to refrigerating apparatus and more particularly to a frostless refrigerator freezer in which the relative sizes of the two compartments can be varied.

In a home, occasionally, there is need for the storage of large amounts of frozen food, for example, in preparation for a party or a large dinner. Also, when there is presented the opportunity for purchasing large quantities of frozen foods or meats at bargain prices, there is a further need for the storage of large amounts of frozen foods. At other times, when large quantities of fresh fruits and vegetables are available at bargain prices, there is a need for a larger capacity in the above-freezing food storage compartment. There is also confusion on the customer's part as to the volume of freezer storage and fresh food storage that will best suit their needs.

It is therefore an object of this invention to provide a frostless refrigerator in which either the below- or the above-freezing food compartments can be enlarged at the loss of the other to any extent desired while the proper air circulation and cooling are maintained in each compartment.

It is another object of this invention to provide a frostless refrigerator cooled by the circulation of refrigerated air from the evaporator located outside the storage compartments, having, separating the compartments, an insulated partition movable to enlarge the size of either compartment at the loss of the other and having an arrangement for automatically adjusting the air circulation in at least one compartment in response to the varying positions of the insulated partition.

It is another object of this invention to provide a frostless refrigerator cooled by the circulation of refrigerated air from an evaporator located outside the two storage compartments, having, separating the compartments, an insulated partition movable to enlarge the size of either compartment at the loss of the other and having an arrangement for opening an increasing number of air circulating openings in one of the compartments as it is enlarged.

It is another object of this invention to provide a frostless refrigerator cooled by the circulation of refrigerated air from an evaporator located outside the two storage compartments, having, separating the compartments therein, an insulated partition movable to enlarge the size of either compartment at the loss of the other and having a plurality of damper doors and an arrangement for holding open an increasing number of the damper doors to provide an increasing air circulation as the insulated partition is positioned to increase the size of the one compartment.

These and other objects are attained in the form shown in the drawings in which an upright insulated refrigerator cabinet is provided with a finned refrigerant evaporator beneath a false bottom wall. A horizontal insulating partition is provided with seven alternate positions at different levels from the extreme bottom to the extreme top so as to divide the cabinet into an upper above-freezing compartment and a lower below-freezing compartment in the second to the sixth positions and to provide an entire above-freezing compartment in the lower position and an entire below-freezing compartment is provided with an outlet at the bottom which is open at all times excepting when the insulating partition is in the bottom position. This opening connects with one side of the evaporator compartment beneath the false bottom wall. The opposite side wall of the cabinet is provided with openings, each provided with doors and associated with the second to the seventh positions of the insulated compartment, arranged with a cam device by which the opening immediately above the partition is opened by the positioning of the partition to provide an air return outlet for the upper above-freezing food compartment.

This outlet or any of the outlets which happen to be open are connected through a duct with the opposite side of the evaporator and provide an air flow through the adjacent side of the evaporator in a series of passes before joining at the front the air from the below-freezing compartment. The mixed air is drawn rearwardly through the remaining portion of the evaporator by a centrifugal fan which operates whenever the motor-compressor unit operates. It discharges into a duct extending up the back wall of the refrigerator cabinet provided with six outlets associated with the upper six positions of the insulating partition and provided with a door for each opening. The doors are all interconnected by lost motion links arranged in such a way that the positioning of the insulated partition in any position will actuate and open all the doors beneath it. As the top of the duct is an opening controlled by damper which is operated in accordance with the temperature of a thermostat bulb located in heat transfer relation with the side wall in an upper portion of the compartment which is set so as to maintain the temperature of the upper compartment at above-freezing temperatures excepting when the insulating partition is in the top position. To prevent frosting of the walls adjacent the insulating partition, the perimeter of the partition is provided with a low wattage electric heater. The operation of the motor-compressor unit is controlled in accordance with the temperature of the side wall of the lower portion of the normal below-freezing compartment, except that, when the entire compartment is above freezing, the control then responds to the above-freezing temperature.

Further objects and advantages of the present invention will be apparent from the following description, reference being had to the accompanying drawings wherein a preferred embodiment of the present invention is clearly shown.

In the drawings:

FIGURE 3 is an enlarged fragmentary sectional view taken substantially along the lines 3—3 of FIGURES 1 and 4;

FIGURE 4 is an enlarged vertical sectional view taken substantially along the line 4—4 of FIGURE 3;

FIGURE 5 is a horizontal sectional view taken substantially along the line 5—5 of FIGURES 1 and 2;

FIGURE 6 is an enlarged fragmentary vertical sectional view showing the doors in the rear wall and their connecting links together with the operating connection with the insulated partition;

FIGURE 7 is a fragmentary horizontal sectional view taken substantially along the line 7—7 of FIGURE 1; and FIGURE 8 is a fragmentary view showing the adjusting dial for the switch controlling the motor-compressor unit.

Figure 1:
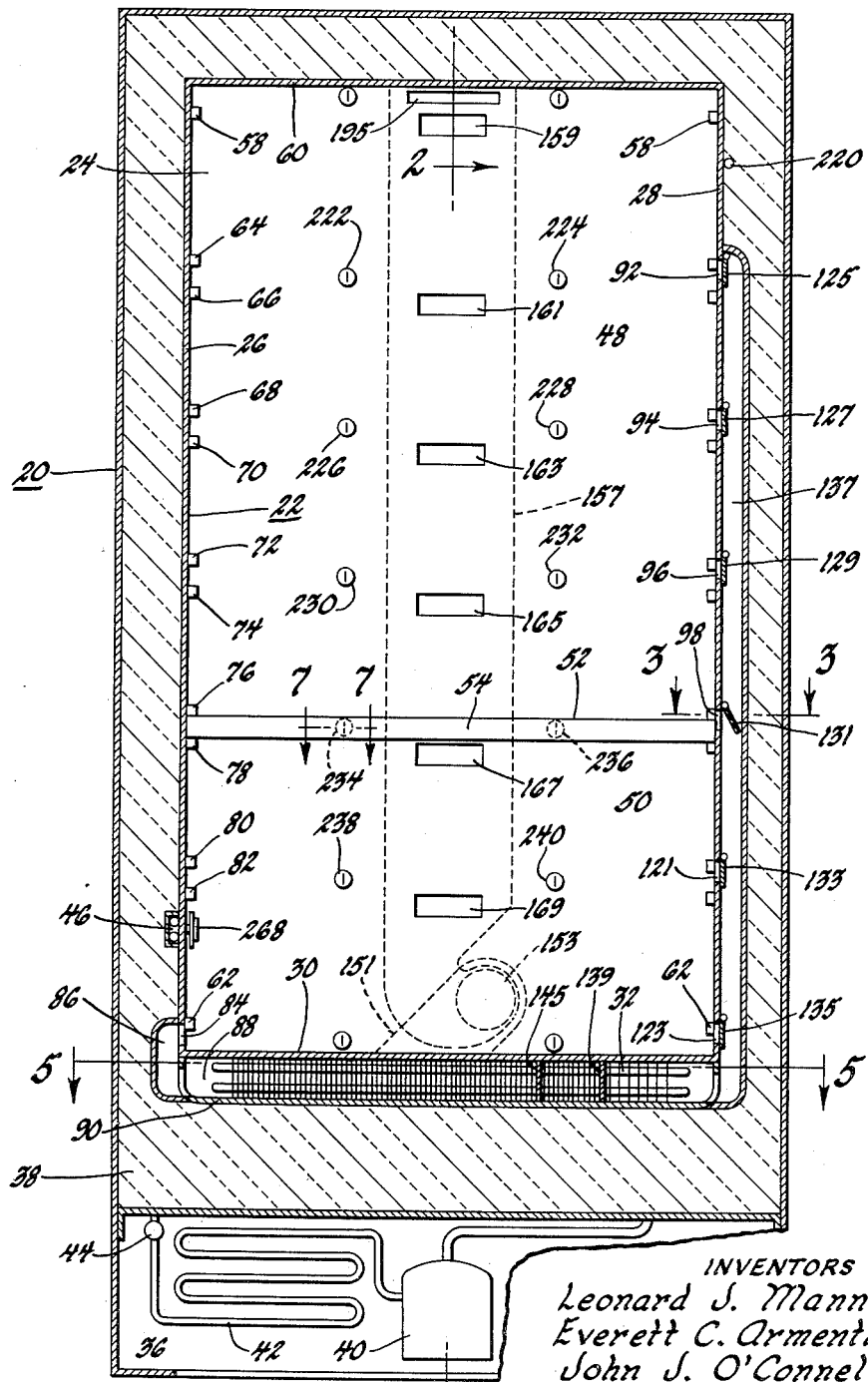
FIGURE 1 is a front vertical section through a refrigerator embodying one form of my invention taken substantially along the line 1—1 of FIGURE 2.
Figure 2:
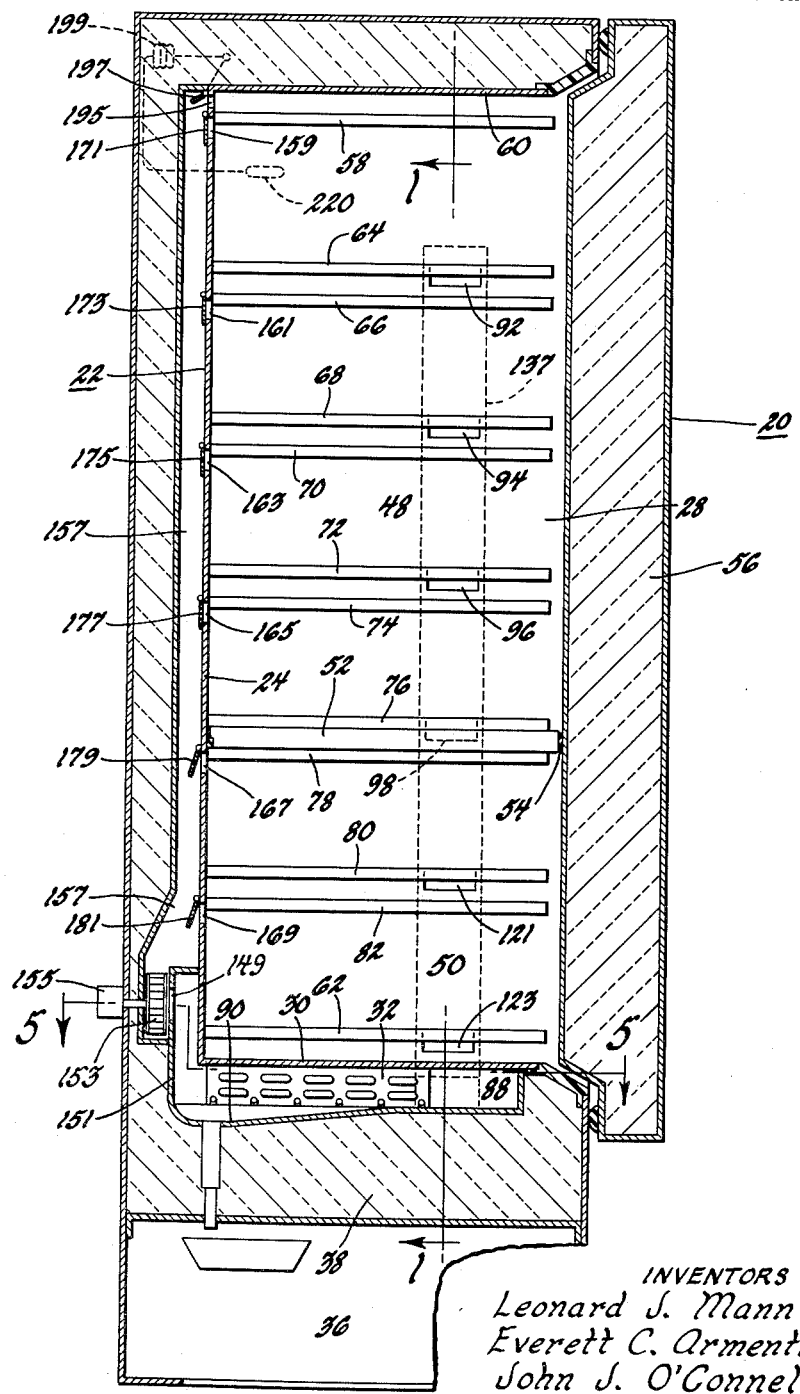
FIGURE 2 is a side vertical sectional view of the refrigerator shown in FIGURE 1 taken substantially along the line 2—2 of FIGURE 1.

Referring now to the drawings and more particularly to FIGURES 1 and 2, there is shown an upright insulated refrigerator cabinet 20 having an inner liner 22 provided with a rear wall 24, left and right side walls 26, 28 and a false bottom wall 30 beneath which there is provided a vertical-finned air-cooling refrigerant evaporator 32. In the machinery compartment 36 beneath the insulated bottom wall 38, there is provided a sealed motor-compressor unit 40 which withdraws evaporated refrigerant from the evaporator 32 and forwards the compressed refrigerant to a condenser 42 from which the liquefied refrigerant is forwarded under the control of a suitable pressure reducing device 44 to the inlet of the evaporator 32. The operation of the motor-compressor unit 40 is controlled by an adjustable refrigerator switch 46 mounted upon the lower left side wall 26 and responsive to the temperature thereof. Preferably, this switch generally is of the type shown in the J. W. Jacobs Patent 2,762,888, issued September 11, 1956.

The interior of the inner liner 22 is normally divided into an upper above-freezing fresh food storage compartment 48 and a lower below-freezing storage compartment 50 for frozen products by an insulated horizontal partition 52. This insulating partition is provided with a resilient gasket seal 54 at the front for making sealing contact with the inner face of the front door 56 providing access to both compartments.

The inner liner 22 is provided with seven different alternative positions for the movable horizontal insulated partition 52. The lower ledges 58 at the top of the cabinet are provided for supporting the partition 52 in the extreme upper position against the top wall 60 while upper ledges 62 at the bottom of the cabinet are provided for holding the insulated partition in the extreme bottom position directly on top of the false bottom wall 30. Upper and lower ledges, designated by the reference characters 64 to 82, provide for the support of the partition 52 in the second to the sixth positions from the top.

At the front of the left side wall 26 beneath the ledge 62, there is provided an outlet opening 84 for the below-freezing compartment 50 which connects through the duct 86 to the left side of the evaporator compartment 88 above the drain pan 90. An outlet opening in the right side wall 28 is provided in conjunction with each of the upper ledges. These openings in the right side wall 28 are each provided with a damper door. The openings are designated in order by the reference characters 92 to 123 while the doors or dampers which are spring closed are designated by the reference characters 125 to 135 in the same order. These doors 125 to 135 open into the vertical downwardly-extending return duct 137 in the right side wall, extending downwardly to the right side of the evaporator compartment 88 between the drain pan 90 and the false bottom wall 30.

As shown best in FIGURE 5, the drain pipe 90 is provided with a baffle 139 extending rearwardly from the front thereof to about three-quarters of the way to the rear of the compartment. The fins upon the evaporator 32 are more widely spaced in the portion thereof to the right of the baffle 139. The purpose of this is to provide more space for the flow of air so that the restriction thereof will not increase rapidly with the deposit of frost thereon. Since the upper compartment 48 is normally maintained at above-freezing temperatures and normally has air with a higher moisture content, it is deemed desirable to pre-cool and dry this air before it is mixed with the air from the below-freezing compartment 50. For this purpose, a pass 141 is provided from the front to the rear through the widely-spaced fin section of the evaporator 32 to the right of the baffle 139, and a second pass 143 is made from the rear to the front between the baffle 139 and the baffle 145 extending forwardly from the rear wall. In the space in front of the evaporator 32 between the baffle 139 and the duct 86, the air from the two compartments is allowed to mix before moving rearwardly through the evaporator 32 between the baffle 145 and the left side wall. The accumulator 147 which is connected to the outlet of the evaporator 32 is located in front of the evaporator in the evaporator compartment.

The mixed air after passing rearwardly through the evaporator is drawn from the evaporator compartment 88 through an outlet 149 at the rear into an upwardly-extending duct 151 connecting to the inlet of a centrifugal fan 153 driven by an electric motor 155. The fan 153 discharges into an upwardly-extending central discharge duct 157 behind the rear wall 24. Associated with each of the six upper positions of the movable partition 52 and located immediately below the partition in these six positions are the inlet openings 159 to 169 in the rear wall 24 opening into the duct 157. Each of the openings 159 to 169 is provided with a door or damper hinged upon its upper edge to the rear wall 24 in the duct 157 and opening thereinto as shown in FIGURE 6. These doors are designated by reference characters 171 to 181 and are normally biased closed by the weight of the doors, the weight of their arms and the weight of the links.

For the purpose of holding open the doors beneath the partition 52, the partition 52 is provided with a rearwardly projecting arm 183 (FIGURE 6) which, when the partition 52 is in its proper position in any of the alternative positions, will engage the door associated with that position in the rear wall 24. As shown in FIGURE 6 in the position shown, the projection 183 engages and pushes rearwardly the door 179 to open the opening 167. The doors above the partition 52, namely the doors 171 to 177, remain closed. However, each of the doors is provided with an arm 185 provided with link pin. Each of the pins excepting the top and bottom pins extends through an aperture in the upper end of a link extending downwardly therefrom and also through a slot at the lower end of a link extending upwardly therefrom. The links are all identical and connect each two adjacent pins. The slots are sufficiently long to permit the door to open completely without opening or moving upwardly the link extending upwardly from its pin. The links shown in FIGURE 6 are designated by the reference characters 187, 189 and 191. As shown in FIGURE 6, the link 191 has been pulled upwardly so that the door 181 has been opened to the same amount as the door 179. Both of these open doors are located beneath the insulated partition 52. The links 189 and 187 above the partition 52 have not been moved upwardly because of the slot at the lower end of the link 189. This permits the doors 171 to 177 to remain closed. Thus, all of these doors 171 to 177 above the partition 52 remain closed while the doors 179 and 181 below the partition 52 are open to provide an adequate amount of cold air flow from the evaporator compartment 88 into the frozen storage compartment 50.

Above the opening 159, there is provided an additional opening 195 for providing sufficient air to the above-freezing compartment 48 to keep it at the desired above-freezing temperature. This opening 195 in the rear wall 24 provides communication with the top of the duct 157. To prevent the compartment 48 from being cooled to below-freezing temperatures, there is provided a door or damper 197 which through a crank and link is moved to a proper position to achieve this result by a fluid motor or bellows 199 which is operated by the fluid provided by a thermostat bulb 220 mounted in heat transfer relation with the upper rear portion of the right side wall 28. The connection between the bulb 220 and the bellows 199 is provided by a capillary tube.

The rear wall 24 is provided with a set of electrical receptacles associated with each position of the insulated partition 52 excepting the top and bottom positions in which dummy receptacles are provided. The active current supply receptacles located in positions 2 to 6 are designated by the reference characters 222 to 240. As is shown in FIGURE 7, each receptacle includes an elastomeric diaphragm 242 having a grooved periphery which fits the edges of the aperture provided in the rear wall 24. This diaphragm seals the receptacle from the moisture within the interior of the liner 22. Behind the rear wall 24 and sealed to it is a metal cap 244. Fastened to this sealed cap member 244 is an insulated receptacle or housing 246 containing a spring fork electrical terminal 248 connected to the supply conductor 250. The spring fork terminal 248 is adapted to receive the blade terminal 252 projecting from its insulated mounting 254 in the rear of the insulated partition 52. This blade-type terminal 252 connects to one end of the low wattage electrical heater 256 which extends twice around the periphery of the insulated partition 52 to the second terminal provided in the rear edge which is adapted to connect in a similar manner with the complementary receptacle to complete the electrical circuit for the heater 256. This heater 256 provides sufficient heat to prevent frosting of the liner 22 just above the insulated partition 52. Such frosting is possible because of the conduction of heat through the metal liner 22 around the periphery of the insulated partition 52.

Preferably, the insulated partition 52 is provided with gasket-type seals around its entire periphery. For example, as shown in FIGURE 4, an elastomeric tubing 260 may be provided within a groove 262 in the bottom ledge 78. This will prevent the leakage of air from the upper compartment 48 to the lower compartment 50 and vice versa. All of the lower ledges may be similarly provided with gasket seals. The upper ledges, such as the ledge 76 (FIGURES 4, 6), for example, are provided with perforations 264 on the top and sides to provide for the adequate flow of air to the outlets 92 to 123 whenever the insulated partition 52 is located adjacent any of these outlets.

The operation with the insulated partition 52 located in the number 5 position as illustrated provides for the withdrawal of air from the below-freezing compartment 50 through the outlet 84 and the duct 86 to the right side of the evaporator chamber 88. Air is also withdrawn from the above-freezing compartment 48 through the perforations 264 in the ledge 76 on the right wall 28 and through the opening 98 provided by the open door 131 and the duct 137 to the right side of the evaporator compartment 88. The door 131 is provided with a cam 266 (FIGURES 3, 4) which is engaged by the adjacent side edge of the insulated partition 52 so as to cam the door 131 outwardly against the tension of the hinge spring 168. The relatively warm air from the duct 137 passes rearwardly on the right side of the baffle 139 through the widely-spaced portion of the evaporator 32 and deposits most of its moisture thereon in the form of frost. The air makes a 180° turn at the rear of the evaporator 32 behind the baffle 139 and continues forwardly between the baffles 139 and 145 to the front of the evaporator 32. Here, this cooled and dried air meets with the air flowing out of the duct 86 and the mixed air then flows rearwardly through the remaining portion of the evaporator 32 to the inlet of the fan 153 which discharges the air upwardly through the duct 157. The arm 183 upon the rear of insulated partition 52 contacts and holds open the door 179 and, through the link 191, the door 181 beneath is held open. The slots in the links above prevent the opening of the central doors 171 to 177 above the door 179. The remaining air flows upwardly past the damper 197 and through the opening 195 into the upper compartment 48. The thermostatic bulb 220 of the damper 197 insures that temperatures in the compartment 48 will be maintained above freezing. The refrigerator switch 46 insures that the air flowing into the compartment 50 from the openings 167 and 169 will provide sufficient cold air to keep the compartment 50 at the desired low temperature of about 0° to 5° F.

In the event that it is desired to convert the entire refrigerator to a freezer, that is, to maintain below freezing temperatures throughout, the insulated partition 52 is moved to the top position so that it rests upon the ledges 58. This closes the outlet 195 although this is immaterial since the thermostat bulb 220 will insure the closing of the damper 197. The projection 183 upon the rear of the insulated partition 52 does engage and open the upper door 171 and through the linkage shown in FIGURE 6 opens all of the doors beneath it. This provides for the adequate distributed inflow of cold air to all levels within the entire inside of the inner liner 22. No opening and no door is provided in the right side wall at this level. Therefore, all of the air must leave the compartment through the outlet 84. The refrigerator switch 46 will continue to operate the motor-compressor unit 40 for sufficiently long periods to insure that the temperature of the air is maintained cold enough to maintain the desired below-freezing temperatures within the entire compartment.

If it is desired to convert the interior into an all fresh food compartment maintained at above-freezing temperatures, the insulated partition 52 is moved to its lower position beneath the ledges 62 directly onto the false bottom wall 30. This substantially closes the outlet 84 and opens the lowermost side door 135. All of the center doors 171 to 181 will be closed, thereby closing the openings 159 to 169. All of the air from the fan 153 will now pass through the duct 157 to the outlet 195 at a rate which will be controlled by the damper 197 under the control of the bellows 199 and the bulb 220 to prevent the single compartment from going below freezing. All of the doors 125 to 135 are provided with cams similar to the cam 266 shown for the door 131 in FIGURES 3 and 4. Therefore, whenever the partition 52 is located in any of the positions associated with any of these doors, the partition will, by engagement with the cam upon the adjacent door, hold the door open so that an outlet is provided immediately above the partition 52 wherever it is located excepting in the top position. Thus, when the partition 52 is in the bottom position, the door 135 will be cammed open so that all of the air from the interior of the compartment will leave through the lower opening 123 and pass through the rearward and forward passages into the main rearward pass in the evaporator compartment 88.

For properly controlling the motor-compressor unit 40 in the bottom position of the insulated partition 52, the adjustment knob 268 (FIGURE 8) upon the refrigerator switch 46 is provided with a high range. When the insulated partition 52 is placed in the bottom position, the high range designation 270 on the dial 268 is turned opposite the indicator 272 as shown in FIGURE 8. This prevents continuous operation of the motor-compressor unit 40. At all other times, the freezer range portion 274 upon the dial 268 is turned to a position opposite the indicator 272.

Through this ararngement of door controlled openings and a movable insulated partition which controls the doors in any of its positions, we are able to obtain complete flexibility in a refrigerator so that freezing and above-freezing compartments of various sizes may be obtained.

While the embodiment of the present invention, as herein disclosed, constitutes a preferred form, it is to be understood that other forms might be adopted.

What is claimed is as follows:

1. Refrigerating apparatus including an insulated cabinet having insulated upright side and rear and lateral top and bottom walls and an insulated front door enclosing a space to be cooled, said cabinet also including an evaporator compartment adjacent said space and an evaporator in said evaporator compartment, a discharge duct means extending from said evaporator compartment and having a plurality of dispersed outlets along an upright wall, separate small door means for normally closing a plurality of said outlets, a movable partition having a plurality of selective alternative positions related to said outlets, means responsive to the location of said partition in a selected position for holding open the small door means of the related outlet, inlet duct means extending from said space to said evaporator compartment, and means for circulating air from said space and through the evaporator compartment and duct means.

2. Refrigerating apparatus including an insulated cabinet having insulated upright side and rear and lateral top and bottom walls and an insulated front door enclosing a space to be cooled, said cabinet also including an evaporator compartment adjacent said space and an evaporator in said evaporator compartment, a discharge duct means extending from said evaporator compartment and having a plurality of dispersed outlets along an upright wall, separate small door means for normally closing a plurality of said outlets, a movable partition having a plurality of selective alternative positions related to said outlets, inlet duct means having a plurality of dispersed inlets along an upright wall related to said outlets, said inlet duct means extending from said space to said evaporator compartment, separate small door means for normally closing said inlet means, means responsive to the location of said partition in a selected position for holding open on one side the small door means of the related outlet and for holding open on the opposite side the small door means of the related inlet, and means for circulating air from said space through said duct means and evaporator compartment.

3. Refrigerating apparatus including an insulated cabinet having insulated upright side and rear and lateral top and bottom walls and an insulated front door enclosing a space to be cooled, said cabinet also including an evaporator compartment adjacent the bottom of said space and a discharge duct means extending from said evaporator compartment upwardly along one of said upright walls and inlet duct means extending downwardly along one of said upright walls to said evaporator compartment, said discharge duct means having a series of vertically separated individual outlets provided with normally closed individual door means, said inlet duct means having a series of vertically separated individual inlets provided with normally closed individual door means and related to said outlets, an evaporator in said evaporator compartment, a vertically movable horizontal partition having a plurality of selective alternative positions related to said outlets and inlets, means responsive to the location of said partition in a selected position for opening the individual door means associated with said outlets below said partition and for opening the individual door means associated with an inlet above said partition, and means for circulating air from said space through said duct means and evaporator compartment.

4. Refrigerating apparatus including an insulated cabinet having insulated upright side and rear and lateral top and bottom walls and an insulated front door enclosing a space to be cooled, said cabinet also including an evaporator compartment adjacent the bottom of said space and a discharge duct means extending from said evaporator compartment upwardly along one of said upright walls and inlet duct means extending downwardly along one of said upright walls to said evaporator compartment, said discharge duct means having a series of vertically separated individual outlets provided with normally closed individual door means, said inlet duct means having a series of vertically separated individual inlets provided with normally closed individual door means and related to said outlets, an evaporator in said evaporator compartment, a vertically movable horizontal partition having a plurality of selective alternative positions related to said outlets and inlets, means responsive to the location of said partition in a selected position for opening the individual door means associated with said outlets below said partition and for opening the individual door means associated with an inlet above said partition, and means for circulating air from said space through said duct means and evaporator compartment, said discharge duct means having a continuously open upper outlet, said inlet duct means having a continuously open lower inlet.

5. Refrigerating apparatus including an insulated cabinet having insulated upright side and rear and lateral top and bottom walls and an insulated front door enclosing a space to be cooled, said cabinet also including an evaporator compartment adjacent the bottom of said space and a discharge duct means extending from said evaporator compartment upwardly along one of said upright walls and inlet duct means extending downwardly along one of said upright walls to said evaporator compartment, said discharge duct means having a series of vertically separated individual outlets provided with normally closed individual door means, said inlet duct means having a series of vertically separated individual inlets provided with normally closed individual door means and related to said outlets, an evaporator in said evaporator compartment, a vertically movable horizontal partition having a plurality of selective alternative positions related to said outlets and inlets, means responsive to the location of said partition in a selected position for opening the individual door means associated with said outlets below said partition and for opening the individual door means associated with an inlet above said partition, means for circulating air from said space through said duct means and evaporator compartment, said discharge duct means having a continuously open upper outlet, said inlet duct means having a continuously open lower inlet, and an adjustable damper associated with said discharge duct means for controlling the flow through said upper outlet.

6. Refrigerating apparatus incldulng an insulated cabinet having insulated walls enclosing a space to be cooled, said cabinet also including an evaporator compartment adjacent said space and an air cooling evaporator in said evaporator compartment, a movable partition within said space extending close to the adjacent surfaces of the walls to separate said space into two storage compartments, said partition having a plurality of selective alternative positions to increase the size of either compartment at a loss to the other, means for circulating air from said two storage compartments through said evaporator compartment in heat transfer with said evaporator and back to said compartments, and means for modifying the circulation of air to said compartments in accordance with the positioning of said partition.

7. Refrigerating apparatus including an insulated cabinet having insulated walls enclosing a space to be cooled, said cabinet also including an evaporator compartment adjacent said space and an air cooling evaporator in said evaporator compartment, a movable partition within said space extending close to and in substantial sealing relation to the adjacent surfaces of the walls to separate said space into two isolated storage compartments in a first position, said partition having a plurality of selective alternative positions substantially parallel to but spaced from said first position to increase the size of either compartment at a loss to the other, means for circulating air from said two storage compartments through said evaporator compartment in heat transfer with said evaporator and back to said compartments, said circulating means including duct means extending along said walls transversely to said partition, said partition in a plurality of said alternate positions having means for opening said duct means to one of said storage compartments.

8. Refrigerating apparatus including an insulated cabinet having insulated walls enclosing a space to be cooled, said cabinet also including an evaporator compartment adjacent said space and an air cooling evaporator in said evaporator compartment, a movable partition within said space extending close to the adjacent surfaces of the walls to separate said space into two storage compartments, said partition having a plurality of selective alternative positions to increase the size of either compartment at a loss to the other, means for circulating air from said two storage compartments through said evaporator compartment in heat transfer with said evaporator and back to said compartments, said circulating means including duct means extending from said evaporator compartment to and from said storage compartments along said walls, said partition in a plurality of said alternate positions having means opening said duct means to said storage compartments on opposite sides of said partition.

9. Refrgerating apparatus including an insulated cabinet having insulated walls enclosing a space to be cooled, said cabinet also including an evaporator compartment adjacent said space and an air cooling evaporator in said evaporator compartment, a movable partition within said space extending close to the adjacent surfaces of the walls to separate said space into two storage compartments, said partition having a plurality of selective alternative positions to increase the size of either compartment at a loss to the other, means for circulating air from said two storage compartments through said evaporator compartment in heat transfer with said evaporator and back to said compartments, said circulating means including duct means extending from said evaporator compartment to and from said storage compartments along said walls, said partition in a plurality of said alternate positions having means providing an increasing number of open apertures between said duct means and one of said storage compartments as the size of said one compartment is increased.

10. Refrigerating apparatus including an insulated cabinet having insulated upright side and rear walls and lateral top and bottom walls and an insulated front door enclosing a space to be cooled, said cabinet also including an evaporator compartment adjacent said space and an air cooling evaporator in said evaporator compartment, a movable horizontal partition extending close to said upright walls and said front door to separate said space into upper and lower storage compartments, said partition having a plurality of selective upper and lower alternative positions to increase the size of either compartment at a loss to the other, means for circulating air from said storage compartments through said evaporator compartment in heat transfer with said evaporator and back to said compartments, and means for modifying the circulation of air to said compartments to compensate for the change in position of said partition.

11. Refrigerating apparatus including an insulated cabinet having insulated upright side and rear walls and lateral top and bottom walls and an insulated front door enclosing a space to be cooled, said cabinet also including an evaporator compartment adjacent said space and an air cooling evaporator in said evaporator compartment, a movable horizontal partition extending close to said upright walls and said front door to separate said space into upper and lower storage compartments, said partition having a plurality of selective upper and lower alternative positions to increase the size of either compartment at a loss to the other, duct means extending to and from said evaporator compartment along said upright walls, said upright walls being provided with a plurality of openings each provided with an individual closure for regulating the communication between said duct means and said storage compartments, and means for circulating air from said storage compartments through said duct means and evaporator compartment and return.

12. Refrigerating apparatus including an insulated cabinet having insulated upright side and rear walls and lateral top and bottom walls and an insulated front door enclosing a space to be cooled, said cabinet also including an evaporator compartment adjacent said space and an air cooling evaporator in said evaporator compartment, a movable horizontal partition extending close to said upright walls and said front door to separate said space into upper and lower storage compartments, said partition having a plurality of selective upper and lower alternative positions to increase the size of either compartment at a loss to the other, duct means extending to and from said evaporator compartment along said upright walls said upright walls being provided with a plurality of openings each provided with an individual closure for regulating the communication between said duct means and said storage compartments, and means for circulating air from said storage compartments through said duct means and evaporator compartment and return, said partition in a plurality of said selective positions having means for opening a closure above it and a closure below it.

13. Refrigerating apparatus including an insulated cabinet having insulated upright side and rear walls and lateral top and bottom walls and an insulated front door enclosing a space to be cooled, said cabinet also including an evaporator compartment adjacent said space and an air cooling evaportor in said evaporator compartment, a movable horizontal partition extending close to said upright walls and said front door to separate said space into upper and lower storage compartments, said partition having a plurality of selective upper and lower alternative positions to increase the size of either compartment at a loss to the other, means for circulating air from said storage compartments through said evaporator compartment in heat transfer with said evaporator and back to said compartments, and means for controlling the circulation through one of said compartments independently of the other to maintain a substantial temperature difference between said compartments.

References Cited in the file of this patent

UNITED STATES PATENTS

| | | |
|---|---|---|
| 1,727,777 | Juneau | Sept. 10, 1929 |
| 1,922,456 | Powell | Aug. 15, 1933 |
| 2,103,683 | Kalischer | Dec. 28, 1937 |
| 2,310,872 | Rundell | Feb. 9, 1943 |
| 2,382,084 | Mathews | Aug. 14, 1945 |